US011109475B2

(12) United States Patent
Nowak

(10) Patent No.: US 11,109,475 B2
(45) Date of Patent: Aug. 31, 2021

(54) CONSUMABLE ASSEMBLY WITH INTERNAL HEAT REMOVAL ELEMENTS

(71) Applicant: The ESAB Group Inc., Florence, SC (US)

(72) Inventor: Joshua Nowak, South Royalton, VT (US)

(73) Assignee: THE ESAB GROUP INC., Annapolis Junction, MD (US)

( * ) Notice: Subject to any disclaimer, the term of this patent is extended or adjusted under 35 U.S.C. 154(b) by 94 days.

(21) Appl. No.: 16/378,634

(22) Filed: Apr. 9, 2019

(65) Prior Publication Data

US 2019/0239331 A1 Aug. 1, 2019

Related U.S. Application Data

(63) Continuation of application No. PCT/US2016/056561, filed on Oct. 12, 2016.

(51) Int. Cl.

*B23K 10/00* (2006.01)
*H05H 1/28* (2006.01)
(Continued)

(52) U.S. Cl.

CPC ................ *H05H 1/28* (2013.01); *H05H 1/26* (2013.01); *H05H 1/34* (2013.01); *H05H 1/32* (2013.01);
(Continued)

(58) Field of Classification Search

CPC .. H05H 1/34; H05H 1/26; H05H 1/32; H05H 1/28; H05H 2001/3436; H05H 2001/3442
(Continued)

(56) References Cited

U.S. PATENT DOCUMENTS 3,676,639 A 7/1972 Esiban et al.
4,967,055 A 10/1990 Raney et al.
(Continued)

FOREIGN PATENT DOCUMENTS

GN 104902665 A 9/2015
KR 101002082 B1 12/2010
WO 2015033252 A1 3/2015

OTHER PUBLICATIONS

International Search Report and Written Opinion for International Application No. PCT/US16/56561, dated Jan. 26, 2017, 14 pages.
(Continued)

*Primary Examiner* — Mark H Paschall
(74) *Attorney, Agent, or Firm* — Edell, Shapiro & Finnan, LLC

(57) ABSTRACT

A consumable assembly for a plasma arc torch is provided, the consumable assembly including an electrode provided within an interior of a nozzle. The electrode may include a sidewall having one or more fluid passageways formed therethrough, an end wall extending from a distal end of the sidewall, and a central cavity defined by an inner surface of the sidewall and the end wall, the central cavity extending between distal and proximal ends of the electrode. The electrode may further include a heat removal element extending into the central cavity from the inner surface of the sidewall. In one embodiment, the consumable assembly includes a current and gas conduit at the proximal end of the electrode, the current and gas conduit including an interior bore radially aligned with the electrode for collectively delivering a plasma gas, a shield gas, and a vent gas into the central cavity of the electrode.

22 Claims, 4 Drawing Sheets

(51) Int. Cl.
*H05H 1/34* (2006.01)
*H05H 1/26* (2006.01)
*H05H 1/32* (2006.01)

(52) U.S. Cl.
CPC ............... *H05H 2001/3436* (2013.01); *H05H 2001/3442* (2013.01)

(58) Field of Classification Search
USPC .............. 219/121.5, 121.51, 121.49, 121.52, 219/121.39
See application file for complete search history.

(56) References Cited

U.S. PATENT DOCUMENTS

2009/0078685 A1 3/2009 Tsai et al.
2011/0259855 A1* 10/2011 Yang ........................ H05H 1/34 219/121.5
2014/0103017 A1 4/2014 Ashtekar et al.
2015/0351213 A1* 12/2015 Crowe ..................... H05H 1/34 219/121.48
2016/0057848 A1* 2/2016 Namburu ................. H05H 1/34 219/121.52
2016/0174353 A1 6/2016 Mitra et al.

OTHER PUBLICATIONS

Extended European Search Report from EP Application No. 16918873, dated May 19, 2020, 8 pages.
Examination Report No. 1 for Australian Patent Application No. 2016426427 dated Oct. 10, 2019, 4 pages.
Office Action for Brazilian Patent Application No. BR112019006665-9 dated May 28, 2020 4 pages.
Chinese Office Action for Chinese Patent Application No. 201680090054.9 dated Aug. 18, 2020, with English translation, 19 pages.
Chinese Office Action for Chinese Patent Application No. 201680090054.9 dated Mar. 8, 2021, with English translation, 19 pages.

* cited by examiner

CONSUMABLE ASSEMBLY WITH INTERNAL HEAT REMOVAL ELEMENTS

CROSS REFERENCE TO RELATED APPLICATIONS

This application claims priority to and is a continuation of International Application PCT/US2016/056561, filed Oct. 12, 2016, entitled "Consumable Assembly with Internal Heat Removal Elements," the entire disclosure of which is incorporated herein by reference.

FIELD OF THE DISCLOSURE

The present disclosure relates generally to plasma arc cutting torches, and more particularly, to a plasma torch consumable assembly designed with internal heat removal elements.

BACKGROUND

Plasma arc torches are widely used for cutting metallic materials and can be employed in mechanized systems for automatically processing a workpiece. A plasma arc system can include the plasma arc torch, an associated power supply, a positioning apparatus and an associated controller. At least one of the plasma arc torch and the workpiece can be mounted on the positioning apparatus, which provides relative motion between the torch and the workpiece to direct the plasma arc along a processing path.

A plasma torch generally includes an electrode, a nozzle having a central exit orifice mounted within a torch body, electrical connections, passages for cooling, passages for arc control fluids (e.g., plasma gas), and a power supply. The torch produces a plasma arc, which is a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be, for example, by means of a high frequency, high voltage signal coupled to a DC power supply and the torch.

Certain components of a plasma arc torch deteriorate over time from use. These "consumable" components include the electrode, swirl ring, nozzle, and shield. Ideally, these components are easily replaceable in the field. Nevertheless, the ability to effectively and efficiently cool these consumables within the torch is critical to ensure reasonable consumable life and cut quality.

Short electrode life due to high erosion rate (e.g., when the plasma arc torch is operated at greater than about 350 Amps) is a common problem for many mechanized plasma arc cutting systems. This short electrode life is mainly caused by the limitations of cooling at the electrode as well as material properties of the electrode. For example, electrode wear typically results in reduced quality cuts. This requires frequent replacement of the electrode to achieve suitable cut quality.

SUMMARY OF THE DISCLOSURE

In view of the foregoing, there is a need in the art for a consumable assembly of a plasma arc torch having improved cooling capabilities through the use of internal heat removal elements and a fluid conduit configured to deliver all gas of the plasma arc torch to an internal cavity of the electrode. Exemplary approaches herein provide a consumable assembly having a nozzle and an electrode provided within an interior of the nozzle. The electrode may include a sidewall having one or more fluid passageways formed the, an end wall extending from a distal end of the sidewall, and a central cavity defined by an inner surface of the sidewall and an inner surface of the end wall, wherein the central cavity extends between distal and proximal ends of the electrode. The electrode may further include a protrusion extending into the central cavity from the inner surface of the sidewall. In one embodiment, the consumable assembly includes a current and gas conduit at the proximal end of the electrode, the current and gas conduit including an interior bore radially aligned with the electrode for collectively delivering a plasma gas, a shield gas, and a vent gas into the central cavity of the electrode.

One approach according to the disclosure includes a consumable for a plasma arc torch, the consumable having a nozzle, and an electrode provided within an interior of the nozzle, wherein the electrode includes a sidewall including one or more fluid passageways formed through the sidewall. The electrode further includes an end wall extending from a distal end of the sidewall, and a central cavity defined by an inner surface of the sidewall and the end wall, wherein the central cavity extending from a proximal end of the electrode to a distal end of the electrode. The electrode further includes a protrusion extending into the central cavity from the inner surface of the sidewall.

Another approach according to the disclosure includes a method of cooling a consumable assembly, the method including providing an electrode within an interior of a nozzle, the electrode having a proximal end and a distal end. The electrode further includes a sidewall extending between the proximal end and the distal end of the electrode, and an end wall extending from the sidewall. The electrode further includes a central cavity defined by an inner surface of the sidewall and an inner surface of the end wall, wherein the central cavity extending from the proximal end to the distal end of the electrode, and a protrusion extending into the central cavity from the inner surface of the sidewall, wherein the protrusion and the inner surface of the sidewall defining a coolant passage. The method further includes directing a fluid into the central cavity of the electrode, wherein the fluid includes a plasma gas, a shield gas, and a vent gas.

Yet another approach according to the disclosure includes an electrode for a plasma arc torch, the electrode having a sidewall including one or more fluid passageways formed through the sidewall, and an end wall extending from a distal end of the sidewall, wherein the end wall includes an emissive insert formed therein. The electrode may further include a central cavity defined by an inner surface of the sidewall and an inner surface of the end wall, wherein the central cavity extending from a proximal end of the electrode to a distal end of the electrode, and a heat exchange element extending radially into the central cavity from the inner surface of the sidewall, wherein the heat exchange element and the inner surface of the sidewall form a portion of a coolant passage.

BRIEF DESCRIPTION OF THE DRAWINGS

The accompanying drawings illustrate exemplary approaches of the disclosure, including the practical application of the principles thereof, and in which.

Figure 1:
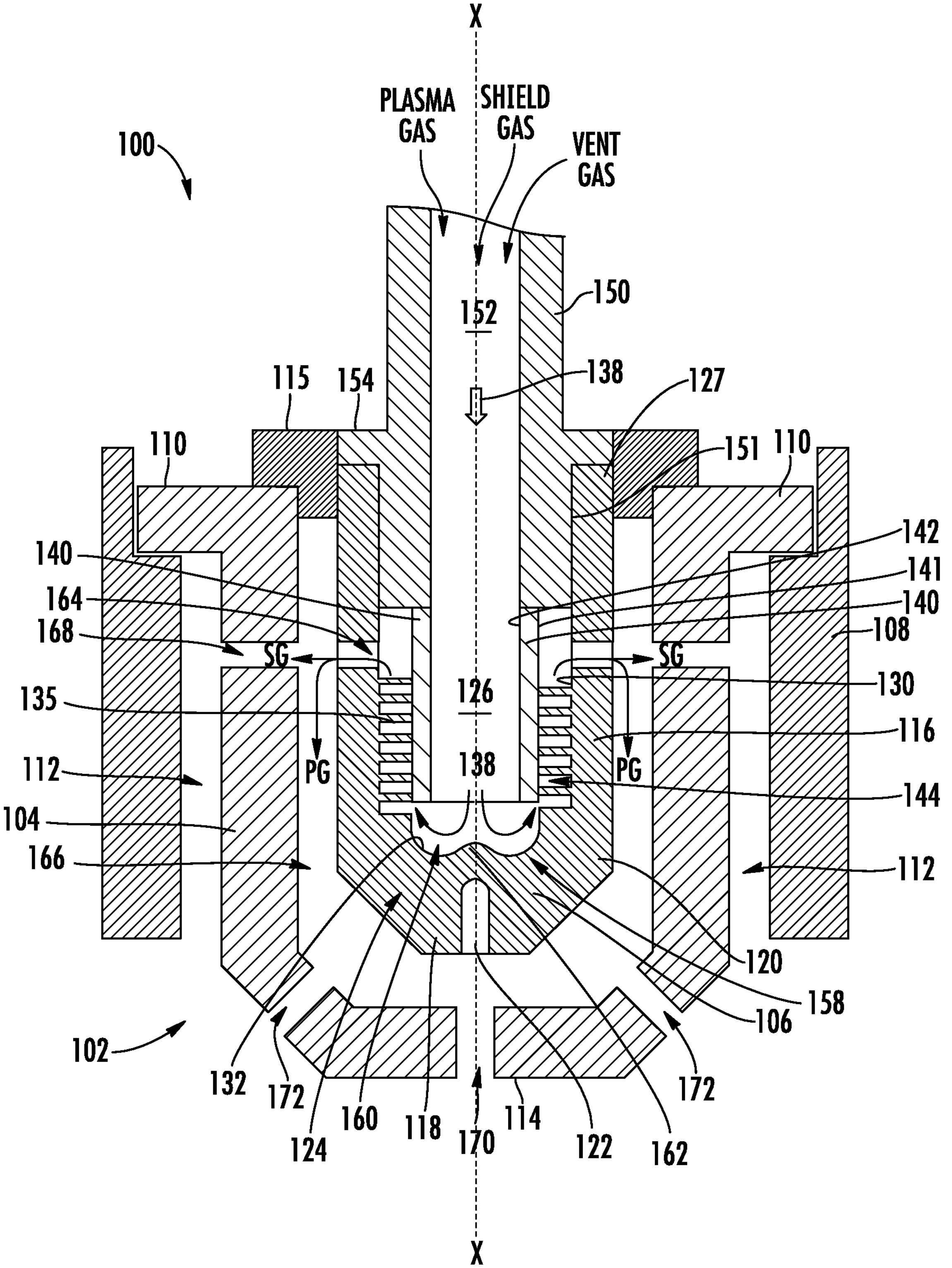
FIG. 1 is a side cutaway view of a portion of a plasma arc torch according to exemplary approaches of the disclosure.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

Plasma arc torches often utilize electrodes that comprise an elongate tubular member composed of a material of high thermal conductivity (e.g., copper, copper alloy, silver, etc.). The forward or discharge end of the tubular electrode includes a bottom end wall having an emissive element embedded therein that supports the arc. The opposite end of the electrode may be coupled in the torch by way of a releasable connection (e.g., threaded connection) to an electrode holder. The electrode holder is typically an elongate structure held to the torch body by a threaded connection at an end opposite the end at which the electrode is held. The electrode holder and the electrode define a threaded connection for holding the electrode to the electrode holder.

The emissive element of the electrode is composed of a material that has a relatively low work function, which is defined in the art as the potential step, measured in electron volts (eV), which promotes thermionic emission from the surface of a metal at a given temperature. In view of this low work function, the element is thus capable of readily emitting electrons when an electrical potential is applied thereto. Commonly used emissive materials include hafnium, zirconium, tungsten, and alloys thereof.

A nozzle surrounds the discharge end of the electrode and provides a pathway for directing the arc towards the workpiece. To ensure that the arc is emitted through the nozzle and not from the nozzle surface during regular, transferred-arc operation, the electrode and the nozzle are maintained at different electrical potential relative to each other. Thus, it is important that the nozzle and the electrode are electrically separated, and this is typically achieved by maintaining a predetermined physical gap between the components. The volume defining the gap is most typically filled with flowing air or some other gas used in the torch operation.

The heat generated by the plasma arc is great. The torch component that is subjected to the most intense heating is the electrode. To improve the service life of a plasma arc torch, it is generally desirable to maintain the various components of the torch at the lowest possible temperature. In some torches, a passageway or bore is formed through the electrode holder, and a coolant such as water is circulated through the passageway to internally cool the electrode.

Even with the water-cooling, the electrode has a limited life span and is considered a consumable part. Thus, in the normal course of operation, a torch operator must periodically replace a consumed electrode by first removing the nozzle and then unthreading the electrode from the electrode holder. A new electrode is then screwed onto the electrode holder and the nozzle is reinstalled so that the plasma arc torch can resume operation.

Thus, there is a need to increase the useful life of the electrode by more efficiently cooling the electrode, while maintaining low cost of manufacture for the electrode and electrode holder. To address this need, exemplary approaches herein provide a one-piece air cooled electrode that provides maximum cooling of the emissive element by utilizing internal heat exchange elements (e.g., fins), and by controlling the flow of all air internally through the electrode, across the heat exchange elements. The internal heat exchange elements act as a heat sink, resulting in improved cooling of the electrode due to the increased mass flow rate. This structure provides significantly higher gas cooling of a plasma electrode than previous designs. Furthermore, the combination of using all of the gas flow, internal fins, and maximum temperature differential, greatly improves cooling of the electrode.

Figure 2:
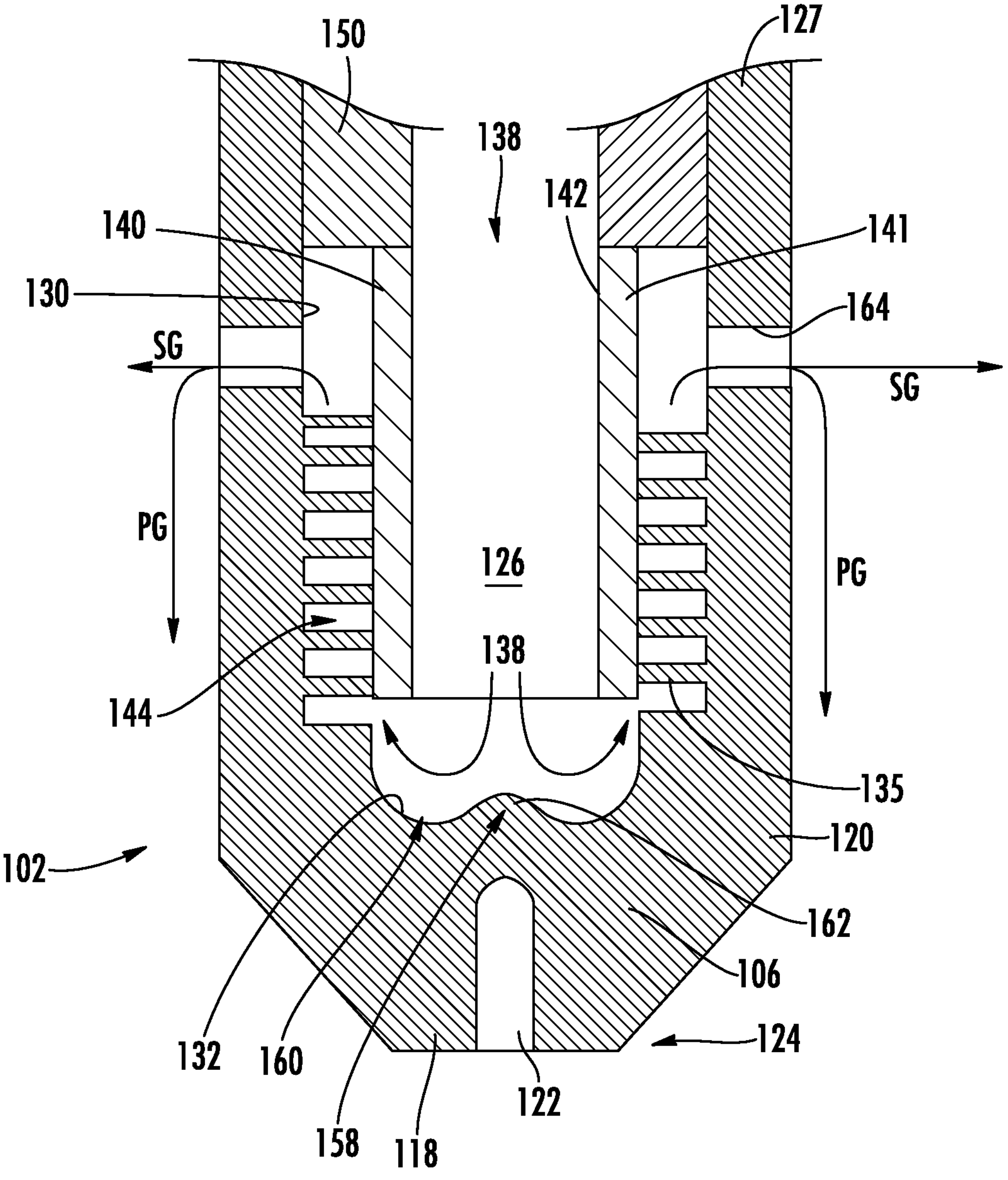
FIG. 2 is a side cutaway view of an electrode of the plasma arc torch of FIG. 1 according to exemplary approaches of the disclosure.

Referring now to FIGS. 1-2, a portion of a plasma arc torch 100 according to an embodiment of the disclosure will be described in greater detail. As shown, the plasma arc torch (hereinafter "torch") 100 includes a consumable 102 including a nozzle 104 and an electrode 106 provided within an interior of the nozzle 104. The nozzle 104 may be coupled to a shield cap 108 at a pair of shoulder regions 110 of the nozzle 104. Formed therebetween is a shield gas passageway 112 configured to deliver a shield gas towards a distal end 114 of the nozzle 104, as will be described in greater detail below. The electrode 106 may be separated from the nozzle 104 by a spacer 115. In exemplary embodiments, the nozzle 104 channels a plasma gas to a cutting aperture 170 to aid in performing a work operation on a workpiece.

As shown, the electrode 106 may include a sidewall 116 and an end wall 118 extending from a distal end 120 of the sidewall 116. The end wall 118 may include an emissive insert 122 formed at a distal end 124 of the electrode 106, e.g., in a central area thereof. The electrode 106 further includes a central cavity 126 within an interior bore of the electrode 106, the central cavity 126 extending from a proximal end 127 of the electrode 106 to the distal end 124 of the electrode 106, e.g., along a longitudinal axis 'X.' As shown, the central cavity 126 may be defined an inner surface 130 of the sidewall 116 and an inner surface 132 of the end wall 118.

The electrode 106 further includes a protrusion 135 extending into the central cavity 126 from the inner surface 130 of the sidewall 116. In some embodiments, the protrusion 135 may be a heat removal element (e.g., a fin), or multiple heat removal elements, extending helically along the inner surface 130 and inwardly towards the central cavity 126. The protrusion 135 advantageously provides additional cooling surface(s) towards the distal end 124 of the electrode 106 so that cooling fluid flowing through the electrode 106 is more effective. As shown, the protrusion 135 may extend through a coolant passage 144, which is defined by the inner surface 130 of the sidewall 116 and an external surface of a coolant conduit 140 disposed within the central cavity 126.

In some embodiments, the coolant conduit 140 is a cylindrical tube extending along the longitudinal axis 'X' within the central cavity 126, configured to deliver a fluid 138 (e.g., a shield gas, a plasma gas, and a vent gas) towards the end wall 118 of the electrode 106. The coolant conduit 140 may be open at each end, and includes an outer surface 141 and an inner surface 142, the outer surface 141 defining the coolant passage 144 with the inner surface 130 of the sidewall 116 of the electrode 106. In various embodiments, the protrusion 135 may extend partially or entirely across the coolant passage 144 towards the coolant conduit 140. In the case the protrusion 135 is integrally coupled to the outer surface 141 of the coolant conduit 140, fluid within the coolant passage 144 is forced to swirl around the electrode 106 in a helical manner, thus increasing cooling. In the case the protrusion 135 is directly connected to only the sidewall 116 or only the outer surface 141 of the coolant conduit, the fluid 138 may simply pass over/around the protrusion 135.

In some embodiments, the fins of the protrusion 135 and the coolant passage 144 can be equally spaced around the inner surface 130 of the sidewall 116. In other embodiments, the fins of the protrusion 135 and the coolant passage 144 are not equally spaced around the sidewall 116 and/or the coolant conduit 140. The spacing of the fins of the protrusion 135 and the coolant passage 144 can further vary depending on the specific cooling needs (e.g., to prevent premature failure of the electrode) of the electrode 106 and/or the torch 100, or the surface area required to meet those cooling needs. The configuration of the protrusion 135 and the coolant passage 144 can depend greatly upon the specific plasma torch design. For a specific application, the heat exchanging elements can be modeled using convention fluid modeling software. In some embodiments, the specific configuration of the protrusion 135 and the coolant passage 144 depends on the geometry of the electrode and/or the coolant conduit 140.

The protrusion 135 can be connected curvilinearly to the inner surface 130 of the sidewall 116 and or the coolant conduit 140. In some embodiments, the protrusion 135 is integrally formed with the sidewall 116 of the electrode 106 (e.g., through a stamping or a hot or cold extruding process), and has a curvilinear (e.g., rounded) surface at and/or near where the protrusion 135 joins with inner surface 130 of the sidewall 116. The protrusion 135 can also be connected curvilinearly to the outer surface 141 of the coolant conduit 140. In some embodiments, the protrusion 135 is integrally formed with the outer surface 141 of the coolant conduit 140 (e.g., through a stamping or a hot or cold extruding process), and the protrusion 135 may have a curvilinear (e.g., rounded) surface at and/or near where the protrusion 135 joins with the outer surface 141 of the coolant conduit 140. The curvilinear surface(s) can increase the surface area of the protrusion 135 to provide additional heat transfer between the protrusion 135 and/or the coolant passage 144 and the cooling gas.

As shown, the torch 100 further includes a current and gas conduit (hereinafter "gas conduit") 150 coupled at the proximal end 127 of the electrode 106. As shown, the gas conduit 150 includes an interior bore 152, which is substantially aligned radially with the cavity 126 of the electrode 106 along the longitudinal axis 'X.' The gas conduit 150 extends to the coolant conduit 140, and may have an attachment surface 151 (e.g., threading or a press fit surface) for securing the gas conduit 150 to the inner surface 130 of the electrode 106. A pair of shoulder regions 154 of the gas conduit 150 extend over the proximal end 127 of the electrode 106 to constrain movement of the gas conduit towards the distal end 124 of the electrode 106. In one embodiment, the gas conduit 150 is either a portion of a torch body of the torch 100, or a separate component coupled to the torch body.

With reference still to FIGS. 1-2, an approach for cooling the electrode 106 according to exemplary embodiments will be described in greater detail. During starting of the torch 100, a difference in electrical voltage potential is established between the electrode 106 and the distal end 114 of the nozzle 104 so that an electric arc forms across the gap therebetween. Plasma gas is then flowed through the nozzle 104 and the electric arc is blown outward from a cutting aperture 170 until it attaches to a workpiece, at which point the nozzle 104 is disconnected from the electric source so that the arc exists between the electrode 106 and the workpiece. The torch 100 is then in a working mode of operation.

For controlling the work operation being performed, it is known to use a control fluid such as a shielding gas to surround the arc with a swirling curtain of gas. Unlike conventional approaches in which the various gases traverse separate areas of the torch, outside of the electrode, embodiments of the present disclosure ensure maximum fluid flow rate, and therefore cooling, by directing all of the fluid 138 into the central cavity 126 of the electrode 106. As shown, a plasma gas, a shield gas, and a vent gas are all supplied to the gas conduit 150. Specifically, the fluid 138 is received at the proximal end 127 of the electrode 106, and then directed through the coolant conduit 140 towards the end wall 118 at the distal end 124 of the electrode 106. As shown by the indicator arrows, the fluid 138 may impact the inner surface 132 of the end wall 118, and move laterally towards the sidewall 116 of the electrode 106, and then into the coolant passage 144. In one embodiment, the electrode 106 includes a deflector 158 positioned centrally along the inner surface 132 of the end wall 118. The deflector 158 may include a pair of concave recesses 160 separated by a central point 162 to facilitate the fluid 138 being split and redirected towards the coolant passage 144.

Once the fluid 138 enters the coolant passage 144, it travels along the protrusion 135 between the exterior surface 141 of the coolant conduit 140 and the inner surface 130 of the sidewall 116 of the electrode. In exemplary embodiments, the fluid 138 travels through the coolant passage 144 in a direction towards the proximal end 127 of the electrode 106, e.g., a an upwards direction when the torch 100 and electrode 106 are oriented as shown in FIGS. 1-2. The fluid 138 may then exit through one or more electrode passages 164 formed through the sidewall 116 of the electrode 106, where the fluid 138 is then directed towards the distal end 124 of the electrode 106 within a channel 166 formed between the electrode 106 and the nozzle 104. As shown, the electrode passages 164 are positioned between the protrusion 135 and the proximal end 127 of the electrode 106, along the longitudinal axis 'X', to allow the fluid 138 to exit the electrode 106 after passing through the protrusion 135. In some embodiments, the electrode passages 164 may be a plurality of slots evenly spaced radially about the electrode 106 in relation to the longitudinal axis 'X.'

In an exemplary embodiment, the fluid 138 splits as it exits the electrode passages 164, whereby the shield gas 'SG' exits through one or more nozzle passageways 168 formed through the nozzle 104, and enters the shield gas passageway 112. In one embodiment, the one or more nozzle passageways 168 may be formed offset relative to one another, for example, along a plane perpendicular to the longitudinal axis 'X,' to increase swirling of the shield gas. Meanwhile, the plasma gas 'PG' travels around the exterior of the electrode 106 within the channel 166 and towards the cutting aperture 170 formed through the nozzle 104. In some embodiments, excess plasma gas may be vented through supplemental nozzle apertures 172, before reaching the cutting aperture 170, to further increase cooling of the distal end 114 of the nozzle 104.

Figure 3:
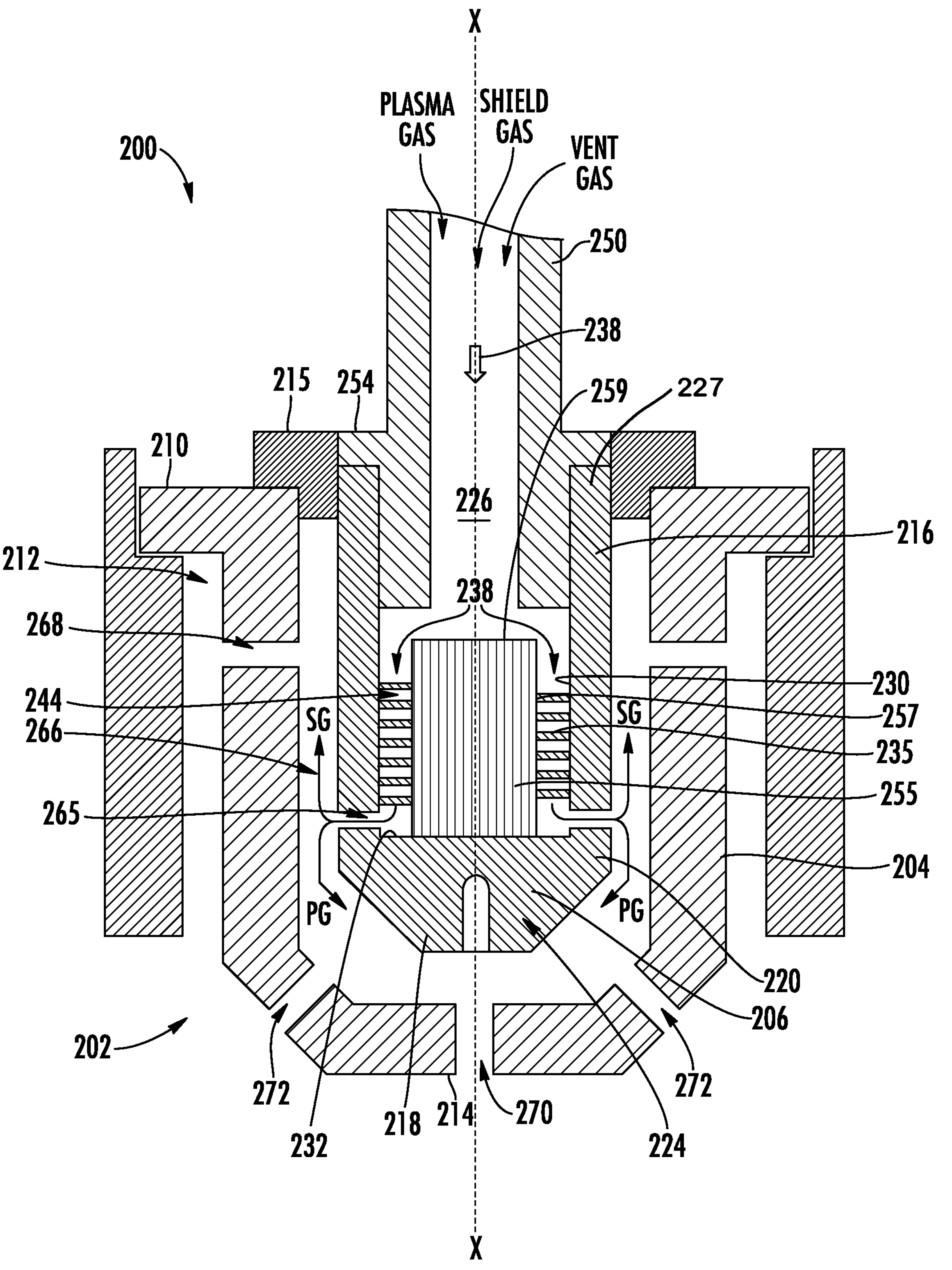
FIG. 3 is a side cutaway view of a portion of a plasma arc torch according to exemplary approaches of the disclosure.

Turning now to FIG. 3, a portion of a plasma arc torch 200 according to another embodiment of the disclosure will be described in greater detail. As shown, the plasma arc torch (hereinafter "torch") 200 includes many or all of the features previously described in relation to the torch 100 of FIGS. 1-2. As such, only certain aspects of the torch 200 will hereinafter be described for the sake of brevity. In this embodiment, the torch 200 includes a consumable assembly 202 including a nozzle 204 and an electrode 206 provided within an interior of the nozzle 204. As shown, the electrode 206 may include a sidewall 216 and an end wall 218 extending from a distal end 220 of the sidewall 216. The electrode 206 further includes a central cavity 226 within an interior bore of the electrode 206, the central cavity 226 extending from a proximal end 227 of the electrode 206 to a distal end 224 of the electrode 206 along a longitudinal axis 'X.' The central cavity 226 is defined by an inner surface 230 of the sidewall 216 and an inner surface 232 of the end wall 218.

The electrode 206 further includes a protrusion 235 extending into the central cavity 226 from the inner surface 230 of the sidewall 216. In some embodiments, the protrusion 235 may be a heat removal element (e.g., a fin), or multiple heat removal elements, extending helically along the inner surface 230, and radially into the central cavity 226. The protrusion 235 may extend to a post 255, which is provided within the central cavity 226, as shown.

More specifically, in some embodiments, the post 255, which may be formed of a thermally conductive material such as copper, is a solid element disposed along the inner surface 232 of the end wall 218 of the electrode 206. The post 255 includes an outer surface 257 and an end surface 259, the outer surface 257 defining a coolant passage 244 with the inner surface 230 of the sidewall 216 of the electrode 206. In exemplary embodiments, the protrusion 235 extends between the sidewall 216 and the post 255, entirely across the coolant passage 244. In other embodiments, the protrusion 235 may extend partially across the coolant passage 244 towards the post 255. In the case the protrusion 235 is in contact with the outer surface 257 of the post 255, the fluid 238 within the coolant passage 244 is encouraged to swirl around the electrode 206 in a helical manner, thus increasing cooling of the electrode 206. In the case the protrusion 235 is directly connected to only the sidewall 216 or only the outer surface 257 of the post 255, the fluid 238 may simply pass over/around the protrusion 235.

During use of the torch 200, a plasma gas, a shield gas, and a vent gas are all supplied to the gas conduit 250. Unlike conventional approaches in which the plasma gas, the shield gas, and the vent gas gases are each delivered to different areas of the torch 200, embodiments of the present disclosure ensure maximum fluid flow rate, and therefore cooling, by directing all of the fluid 238 into the central cavity 226 of the electrode 206 via the gas conduit 250. Specifically, the plasma gas, the shield gas, and the vent gas mix at the proximal end 227 of the electrode 206 to form combined fluid 238, which is then directed through the central cavity 226 towards the end surface 259 of the post 255. As shown by the indicator arrows, the fluid 238 may impact the post 255, where it is then split and directed laterally towards the sidewall 216 of the electrode 206, and into the coolant passage 244. In one embodiment, the end surface 259 of the post 255 includes an angled surface and/or rounded corners to split and motivate the fluid 238 laterally towards the coolant passage 244.

Once the fluid 238 enters the coolant passage 244, it travels along the protrusion 235 between the outer surface 257 of the post 255 and the inner surface 230 of the sidewall 216. In exemplary embodiments, the fluid 238 travels through the coolant passage 244 in a direction towards the distal end 224 of the electrode 206. The fluid 238 may then exit through one or more electrode passages 265 formed through the sidewall 216 of the electrode 206, where the fluid 238 is then directed towards the distal end 224 of the electrode 206 through a channel 266 formed between the electrode 206 and the nozzle 204. In an exemplary embodiment, the fluid 238 splits as it exits the electrode passages 265, whereby the shield gas 'SG' is delivered towards the proximal end 227 of the electrode and exits through one or more nozzle passageways 268 formed through the nozzle 204. Meanwhile, the plasma gas 'PG' travels around the exterior of the electrode 206 within the channel 266 and towards a cutting aperture 270 formed through the distal end 214 of the nozzle 204. In some embodiments, excess PG may be vented at supplemental nozzle apertures 272, before reaching the cutting aperture 270, to further increase cooling of the distal end 214 of the nozzle 204.

Figure 4:
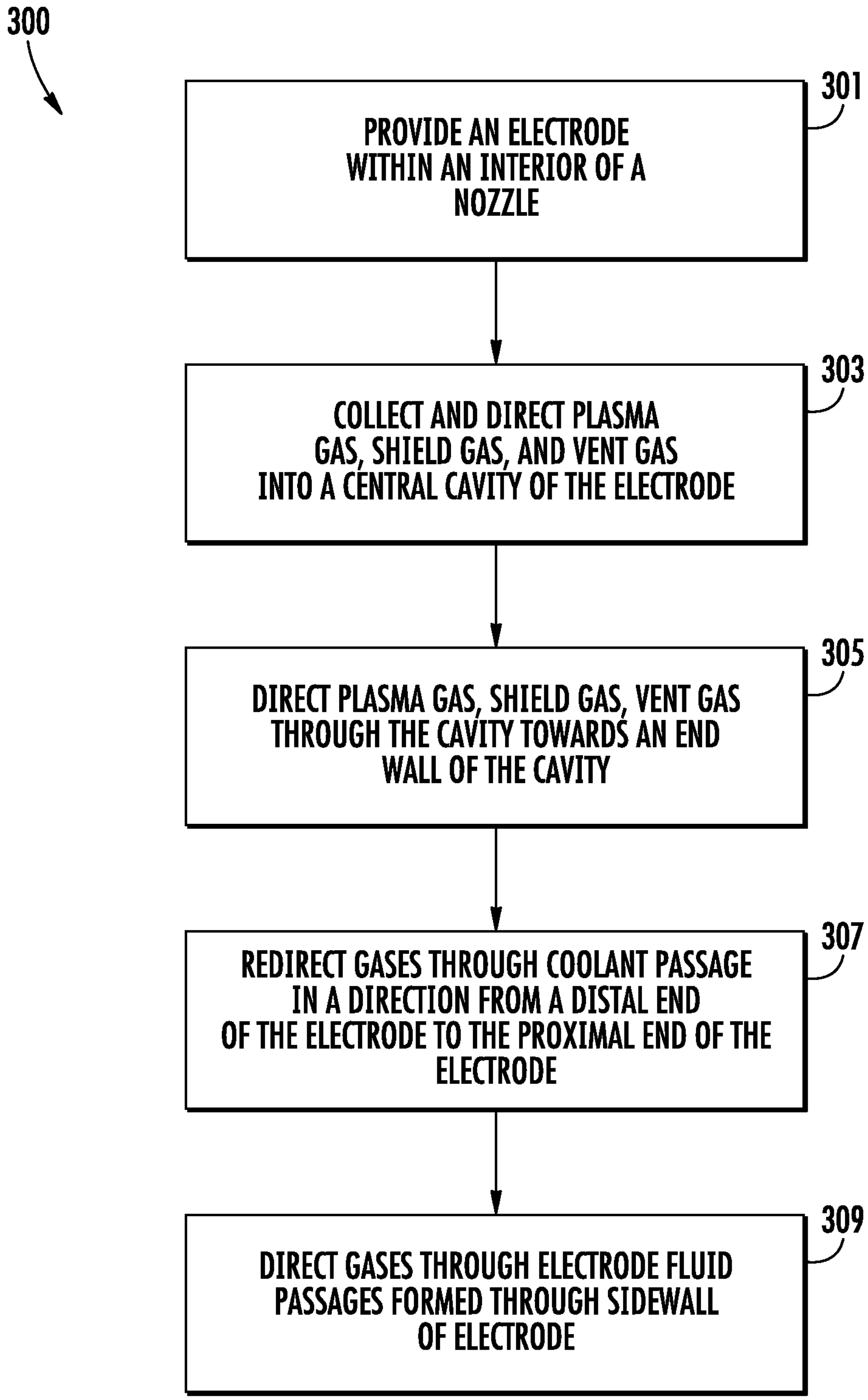
FIG. 4 is a flowchart illustrating an exemplary process according to the present disclosure.

Turning now to FIG. 4, a process flow 300 for cooling a consumable assembly of a plasma arc torch according to embodiments of the disclosure will be described in greater detail. As shown, the process flow 300 includes providing an electrode within an interior of a nozzle, as shown at block 301. In some embodiments, the electrode includes a sidewall, an end wall extending from the sidewall, and a central cavity defined by an inner surface of the sidewall and an inner surface of the end wall, wherein the central cavity extends from a proximal end to a distal end of the electrode. The electrode may further include a protrusion extending into the central cavity from the inner surface of the sidewall, the protrusion and the inner surface of the sidewall defining a part of a coolant passage. In some embodiments, the protrusion is a heat exchange element (e.g., a fin or multiple fins) extending helically around the inner surface of the sidewall.

The process flow 300 may further include directing a fluid into the central cavity of the electrode, as shown at block 303, wherein the fluid includes a plasma gas, a shield gas, and a vent gas. In one embodiment, the torch includes a current and gas conduit disposed at the proximal end of the electrode, wherein the current and gas conduit includes an interior bore radially aligned with the cavity of the electrode for receiving and then delivering, into the central cavity of the electrode, the plasma gas, the shield gas, and the vent gas.

The process flow 300 may further include directing the fluid through the cavity towards the end wall of the electrode, as shown at block 305. In one embodiment, a coolant conduit is disposed within the central cavity for directing the flow of gas towards the end wall. In one embodiment, a post is disposed within the central cavity, wherein the post is in contact with the protrusion and the inner surface of the end wall of the electrode. In one embodiment, the end wall of the electrode includes a deflector extending along the inner surface thereof, the deflecting including a central point protruding into the cavity to direct the fluid towards the coolant passage.

The process flow 300 may further include redirecting the fluid through the coolant passage in a direction from the distal end of the electrode towards the proximal end of the electrode, as shown in block 307. In one embodiment, the fluid swirls helically around the coolant conduit.

The process flow 300 may further include directing the fluid from the coolant passage through one or more electrode passages formed through the sidewall of the electrode, as shown at block 309. In one embodiment, the shield gas is directed from the one or more electrode passages to a shield gas passageway formed between the electrode and the nozzle. In one embodiment, the plasma gas is directed through the one or more electrode passages and into a channel formed between the electrode and the nozzle.

It will be appreciated that at least the following benefits are achieved by embodiments of the present disclosure. Firstly, using all the gas flow to cool the electrode with the coldest possible gas creates the greatest amount of cooling because of the larger temperature difference and increased mass flow rate. Secondly, by providing fins of a heat exchange element along the path of the gas flow further enhances heat transfer due to the increased surface area. Thirdly, the internal coolant passages and resultant redirection of fluid within the electrode, increases the amount of time fluid is present within the electrode and exchanging heat with the heat removal element(s).

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

What is claimed is:

1. A plasma arc torch consumable assembly comprising:
a nozzle; and
an electrode provided within an interior of the nozzle, the electrode including:
a sidewall including one or more fluid passageways extending from an inner surface to an exterior surface of the sidewall;
an end wall extending from a distal end of the sidewall;
a central cavity defined by the inner surface of the sidewall and an inner surface of the end wall, the central cavity extending from a proximal end of the electrode to a distal end of the electrode; and
a protrusion extending helically along the inner surface of the sidewall and radially into the central cavity from the inner surface of the sidewall, the protrusion and the inner surface of the sidewall defining a coolant passage.

2. The plasma arc torch consumable assembly of claim 1, the electrode further comprising a coolant conduit within the central cavity for delivering a fluid from the proximal end of the electrode to the end wall.

3. The plasma arc torch consumable assembly of claim 2, wherein the coolant passage is disposed between the inner surface of the sidewall and an outer surface of the coolant conduit, wherein the protrusion traverses through the coolant passage.

4. The plasma arc torch consumable assembly of claim 2, the electrode further comprising a deflector extending from the inner surface of the end wall and into the central cavity, the deflector configured to redirect the fluid laterally towards the coolant passage.

5. The plasma arc torch consumable assembly of claim 2, wherein the one or more fluid passageways of the electrode are positioned between the protrusion and the proximal end of the electrode to allow the fluid to exit the electrode after passing through the coolant passage.

6. The plasma arc torch consumable assembly of claim 1, wherein the protrusion is a heat exchange element.

7. The plasma arc torch consumable assembly of claim 1, wherein the nozzle includes a cutting aperture and one or more nozzle passages.

8. The plasma arc torch consumable assembly of claim 1, further comprising a post extending from the inner surface of the end wall and into the central cavity, wherein a radial outer surface of the post is in contact with the protrusion.

9. The plasma arc torch consumable assembly of claim 1, further comprising a current and gas conduit disposed at the proximal end of the electrode, the current and gas conduit including an interior bore aligned with the central cavity of the electrode, wherein the current and gas conduit delivers a fluid for use as one or more of a plasma gas, a shield gas, and/or a vent gas into the central cavity of the electrode.

10. The plasma arc torch consumable assembly of claim 8, wherein the one or more fluid passageways of the electrode are disposed between the protrusion and the distal end of the electrode to allow fluid to exit the electrode after passing through the coolant passage.

11. A method of cooling a consumable assembly, the method comprising:
providing an electrode within an interior of a nozzle, the electrode having a proximal end and a distal end, and the electrode further comprising:
a sidewall extending between the proximal end and the distal end of the electrode;
one or more fluid passageways extending from an inner surface to an exterior surface of the sidewall;
an end wall extending from the sidewall;
a central cavity defined by an inner surface of the sidewall and an inner surface of the end wall, the central cavity extending from the proximal end to the distal end of the electrode; and a protrusion extending helically along the inner surface of the sidewall and radially into the central cavity, the protrusion and the inner surface of the sidewall defining a coolant passage; and directing a fluid into the central cavity of the electrode, through the coolant passage, and out the one or more fluid passageways, wherein the fluid is used as one or more of a plasma gas, a shield gas, and/or a vent gas.

12. The method of claim 11, further comprising delivering the fluid into the central cavity of the electrode via a current and gas conduit disposed at the proximal end of the electrode, the current and gas conduit including an interior bore aligned with the central cavity of the electrode.

13. The method of claim 11, further comprising:

directing the fluid through the central cavity towards the end wall; and redirecting the fluid through the coolant passage from the distal end of the electrode towards the proximal end of the electrode.

14. The method of claim 11, further comprising directing the fluid from the one or more fluid passageways to a shield gas passageway formed between the electrode and the nozzle.

15. The method of claim 11, further comprising directing the fluid towards the end wall via a coolant conduit disposed within the central cavity.

16. The method of claim 11, wherein the electrode further comprises a post within the central cavity, wherein the post is in contact with the protrusion and the inner surface of the end wall of the electrode.

17. An electrode for a plasma arc torch, the electrode comprising:

a sidewall including one or more fluid passageways extending from an inner surface to an exterior surface of the sidewall;

an end wall extending from a distal end of the sidewall, the end wall including an emissive insert formed therein;

a central cavity defined by an inner surface of the sidewall and an inner surface of the end wall, the central cavity extending from a proximal end of the electrode to a distal end of the electrode; and a heat exchange element extending helically along the inner surface of the sidewall and radially into the central cavity from the inner surface of the sidewall, the heat exchange element and the inner surface of the sidewall forming a coolant passage.

18. The electrode of claim 17, further comprising a coolant conduit disposed within the central cavity for delivering a fluid to the end wall.

19. The electrode of claim 18, wherein the one or more fluid passageways of the electrode are positioned between the heat exchange element and the proximal end of the electrode to allow the fluid to exit the electrode after passing through the coolant passage.

20. The electrode of claim 18, further comprising a deflector extending from the inner surface of the end wall and into the central cavity to redirect the fluid towards the coolant passage.

21. The electrode of claim 17, further comprising a post disposed within the central cavity, wherein the post is in contact with the heat exchange element and the inner surface of the end wall.

22. The electrode of claim 21, wherein the one or more fluid passageways of the electrode are disposed between the heat exchange element and the distal end of the electrode to allow fluid to exit the electrode after passing through the coolant passage.

* * * * *